(12) United States Patent
Klein et al.

(10) Patent No.: US 8,621,492 B2
(45) Date of Patent: Dec. 31, 2013

(54) APPLICATION LEVEL CONTEXTS

(75) Inventors: Udo Klein, Maximiliansau (DE); Martin Hartig, Speyer (DE)

(73) Assignee: SAP AG, Walldorf (DE)

( * ) Notice: Subject to any disclaimer, the term of this patent is extended or adjusted under 35 U.S.C. 154(b) by 437 days.

(21) Appl. No.: 12/970,863

(22) Filed: Dec. 16, 2010

(65) Prior Publication Data

US 2012/0159522 A1 Jun. 21, 2012

(51) Int. Cl.
*G06F 9/54* (2006.01)

(52) U.S. Cl.
USPC .......................................................... 719/328

(58) Field of Classification Search
USPC ........... 717/122, 126, 129, 116, 127; 719/328
See application file for complete search history.

(56) References Cited

U.S. PATENT DOCUMENTS

| | | | |
|---|---|---|---|
| 2002/0099837 A1* | 7/2002 | Oe et al. .................... | 709/229 |
| 2008/0092150 A1* | 4/2008 | Jethi et al. .................. | 719/328 |
| 2009/0019424 A1* | 1/2009 | Klein et al. ................. | 717/116 |
| 2009/0049288 A1* | 2/2009 | Weissman ................... | 712/245 |
| 2010/0198730 A1* | 8/2010 | Ahmed et al. .............. | 705/50 |
| 2010/0325159 A1* | 12/2010 | Wright et al. ............... | 707/783 |
| 2011/0154364 A1* | 6/2011 | Vaddagiri .................... | 719/313 |
| 2011/0191485 A1* | 8/2011 | Umbehocker .............. | 709/229 |
| 2011/0307959 A1* | 12/2011 | Singh et al. ................. | 726/26 |

* cited by examiner

*Primary Examiner* — H S Sough
*Assistant Examiner* — Brian W Wathen
(74) *Attorney, Agent, or Firm* — Mintz Levin Cohn Ferris Glovsky and Popeo, P.C.

(57) ABSTRACT

A call for an application programming interface can be received from an application component at a context checking module, and a current application context of the application component within which the call for the application programming interface was generated can be determined. A context token of the application programming interface can be compared with the current application context, and if the context token does not match the context token, a remedial action can be executed. Related methods, systems, and articles of manufacture are disclosed.

19 Claims, 6 Drawing Sheets

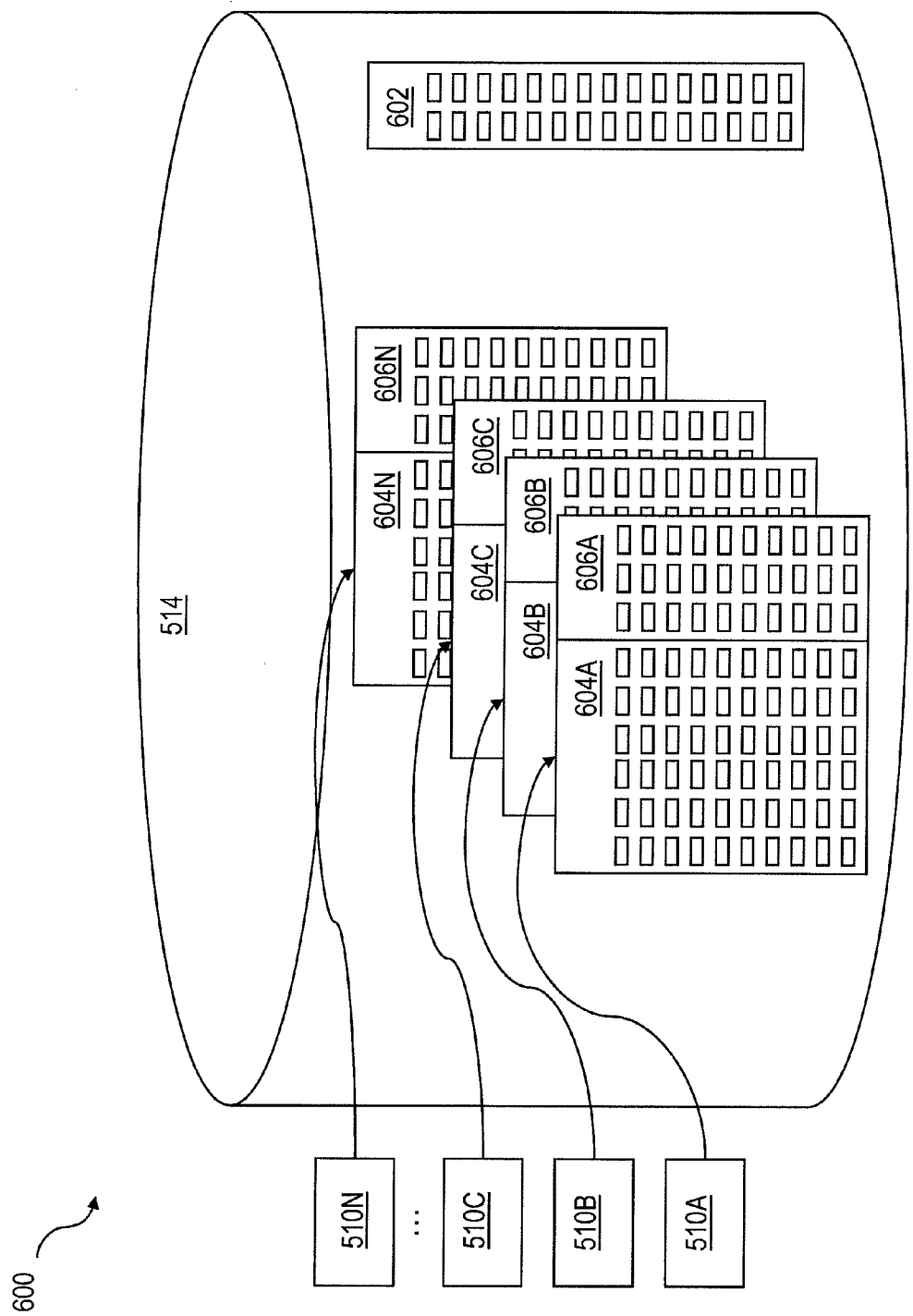

APPLICATION LEVEL CONTEXTS

TECHNICAL FIELD

The subject matter described herein relates to verifying and/or ensuring contextual consistency for a computer application, a software architecture that includes multiple applications, and the like.

BACKGROUND

Optimizing performance of computing systems can be important to operation of such systems. Users, other applications, components, etc. can depend on the proper operation of a specific application running as part of an integrated software architecture, performance optimization of which can be a complicated process.

One example of an integrated software architecture is an enterprise resource planning (ERP) software architecture, that many organizations employ to provide computer-based systems for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those performed by applications provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like. Cooperation and inter-communication between the installed components and applications that provide such features can be facilitated by one or more interfaces tasked with exchanging data between various platforms and databases that may employ different data formats.

Tracking and verification of whether a correct, optimized interface is applied in each interaction between installed components of a complex, integrated software architecture can be very challenging. Because a single developer or even a single developer team is not generally responsible for creating and harmonizing content providers (e.g. applications, components, etc. that can be provided from one or more third party developers), a high probability exists for applications or components to inadvertently call interfaces that are not properly optimized for the current context of a communication interaction. In some instances, performance issues can be caused by inappropriate usage of interfaces for communication among applications and components in a software architecture. For example, a design time interface may be used at runtime, which can cause large processing overheads that can degrade performance significantly.

SUMMARY

In one aspect, a method includes receiving a call for an application programming interface from an application component at a context checking module, determining a current application context of the application component within which the call for the application programming interface was generated, comparing a context token of the application programming interface with the current application context, and executing a remedial action if the context token does not match the context token.

In some variations one or more of the following can optionally be included. The remedial action can include one or more of terminating the call for the application programming interface, sending or displaying an alert message to the user whose process called the application programming interface, notifying a team leader or other member of a development team, creating an event log entry relating to the call, and notifying quality management personnel. The current application context can be part of a core software platform that integrates functionality of a plurality of application components from a plurality of development teams, and the application programming interface is part of an application component of the plurality of application component. The current application context can include one of run time, design time, testing, authorization check, database access, user interface access. The context token can be added by a developer of the application programming interface at design time, and the context token can be selected by the developer from a limited set of pre-defined contexts. The developer can be part of a first development entity, and the application programming interface can be exposed for integration of communication and/or data exchange with at least one second application component developed by a second development entity distinct from the first development entity. The application component and the second application component can be included in plurality of application components within an integrated software architecture.

The integrated software architecture can, in some aspects be a multi-tenant architecture that includes an application server and a data repository. The application server can provide access for each of a plurality of organizations to at least one of a plurality of client tenants, each of which can be configured to provide isolated access to a customizable instance of a core software platform. The data repository can include core software platform content common to all of the plurality of client tenants and relating to operation of the core software platform, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

It should be noted that, while the descriptions of specific implementations of the current subject matter discuss delivery of enterprise resource planning software to multiple organizations via a multi-tenant system, the current subject matter is applicable to other types of software and data services access as well. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 is a diagram showing storage of both core software package data objects and tenant-specific data objects for each of multiple tenants of a multi-tenant system.

When practical, similar reference numbers denote similar structures, features, or elements.

DETAILED DESCRIPTION

To address the above-noted and potentially other issues with currently available solutions, one or more implementations of the current subject matter provide methods, systems, articles or manufacture, and the like that can, among other possible advantages, provide a technical approach for detecting inappropriate usage of versions of interfaces and/or other application components at runtime. For example, rather than requiring that a developer hard code for each application programming interface (API) the appropriate permissions, conditions, limitations, requirements, and the like for which that API is designed and/or optimized, the developer need only specify one of a limited list of predefined contexts. Then, when the API is called, a determination of the current context is made and compared to the specified context of the API. If the current context and the specified context match, the API can be allowed to proceed as called. However, if the current context and the specified context do not match, one or more actions s described herein can be taken to remedy the mismatched contexts.

Consistent with one or more implementations of the current subject matter, a specified application context can include one or more tokens added at design time. The one or more tokens can specify a current applicant context with which an API or other applicant component bearing the token is compatible. Examples of such tokens (and their semantics) include, but are not limited to be run time, design time, testing, authorization check, database access, user interface access, and the like.

As an example, a token assigned to a performance-critical interface can be checked against a current application context to verify whether that interface is appropriately optimized for the current application context. An interface that is intended or optimized for use at design time would include a token that only matches a design time context. Thus, if the application sets a runtime application context but not a design time application context, a call to the interface having only a design time token would trigger execution of a remedial action, such as for example those noted below.

An application and interface context checking process can be implemented in such a way that inactive checks do not consume processor resources at customer runtime. In other words, the checks can set to be active only in development systems, test systems, or the like. In those systems they may consume runtime. In production systems they will be deactivated by default and thus not consume any runtime.

Figure 1:
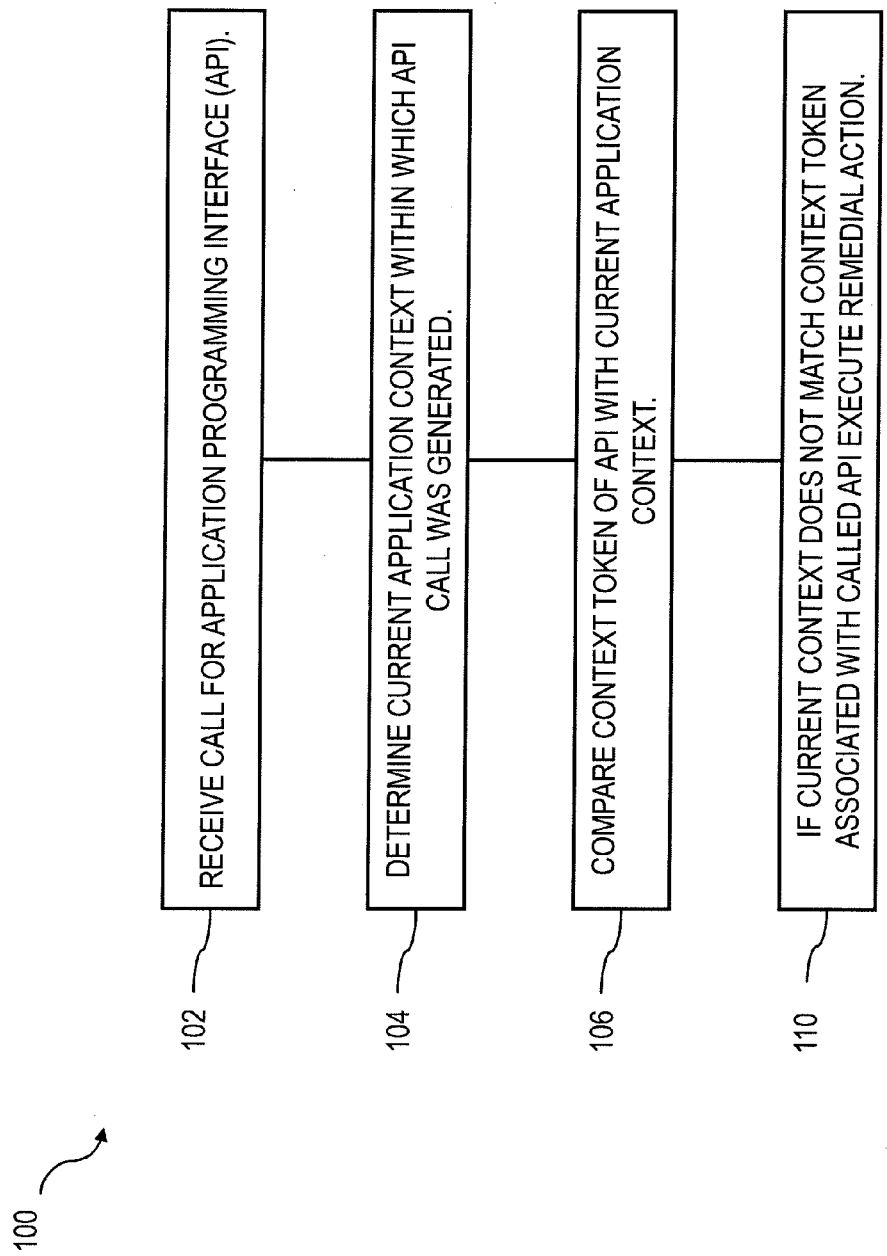
FIG. 1 is a process flow diagram illustrating aspects of a method consistent with implementations of the current subject matter.

In one implementation illustrated by the process flow chart 100 of FIG. 1, a method consistent with one or more features of the current subject matter can include the following features. At 102, a call for an application programming interface (API) can be received at context checking module executing on a system including one or more processors. At 104, the current application context within which the call was generated can be determined by the context checking module. This determining of the current application context can optionally include comparing one or more parameters indicative of the current application context to one or more pre-defined patterns that are characteristic of a set of pre-defined contexts. Alternatively or in addition, a flag can be set during run time that indicates the current application context as selected from the set of pre-defined contexts. At 106, a context token associated with the called API can be compared with the current application context. If the context token and the current application context match, the call for the API can result in execution of the API. However, if the current context does not match any context tokens associated with the called API, one of several remedial actions can be taken at 110.

Illustrative but non-limiting examples of remedial actions include terminating the call for the API, sending or displaying an alert message to the user whose process called the API, notifying a team leader or other member of a development team, creating an event log entry relating to the call, notifying quality management personnel, and the like.

Figure 2:
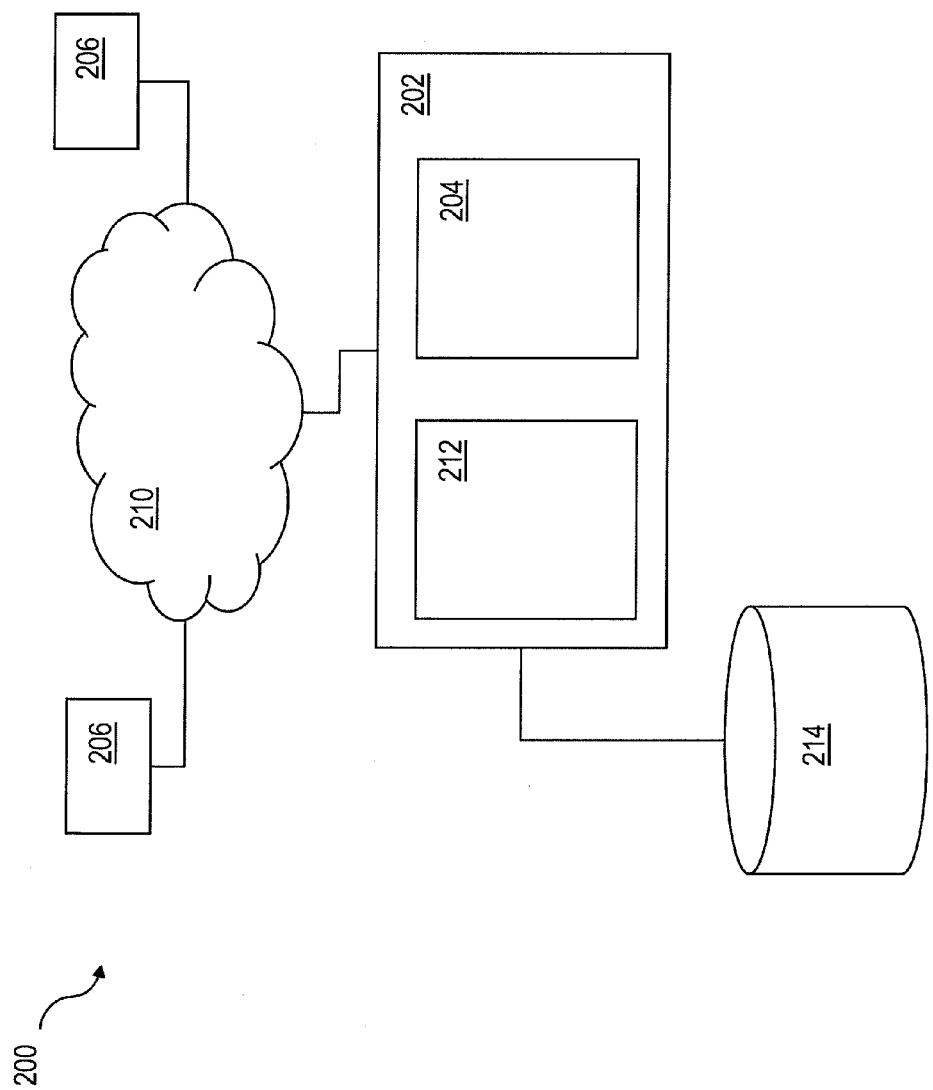
FIG. 2 is a box diagram illustrating aspects of a system consistent with implementations of the current subject matter.

FIG. 2 shows a system 200 illustrating features consistent with at least one implementation of the current subject matter. A computing system 202 that includes one or more programmable processors, which can be collocated, linked over one or more networks, etc., can execute one or more first modules 204 that provide one or more ERP or other software application functions accessible to local users as well as remote users accessing the computing system 202 from one or more client machines 206 over a network connection 210. When a call to an application programming interface (API) is made, either by an action executed by a user or automatically via a call from a running software program, a context checking module 212 access a token associated with the called API and checks the token against the current application context within which the API is to be executed. If the token matches the current application context, the call to the API can be allowed to proceed. However, if the token does not match the current application context, one or more remedial actions are taken, such as for example those noted above. The computing system 202 can access data and data objects stored in one or more data repositories 214.

Figure 3:
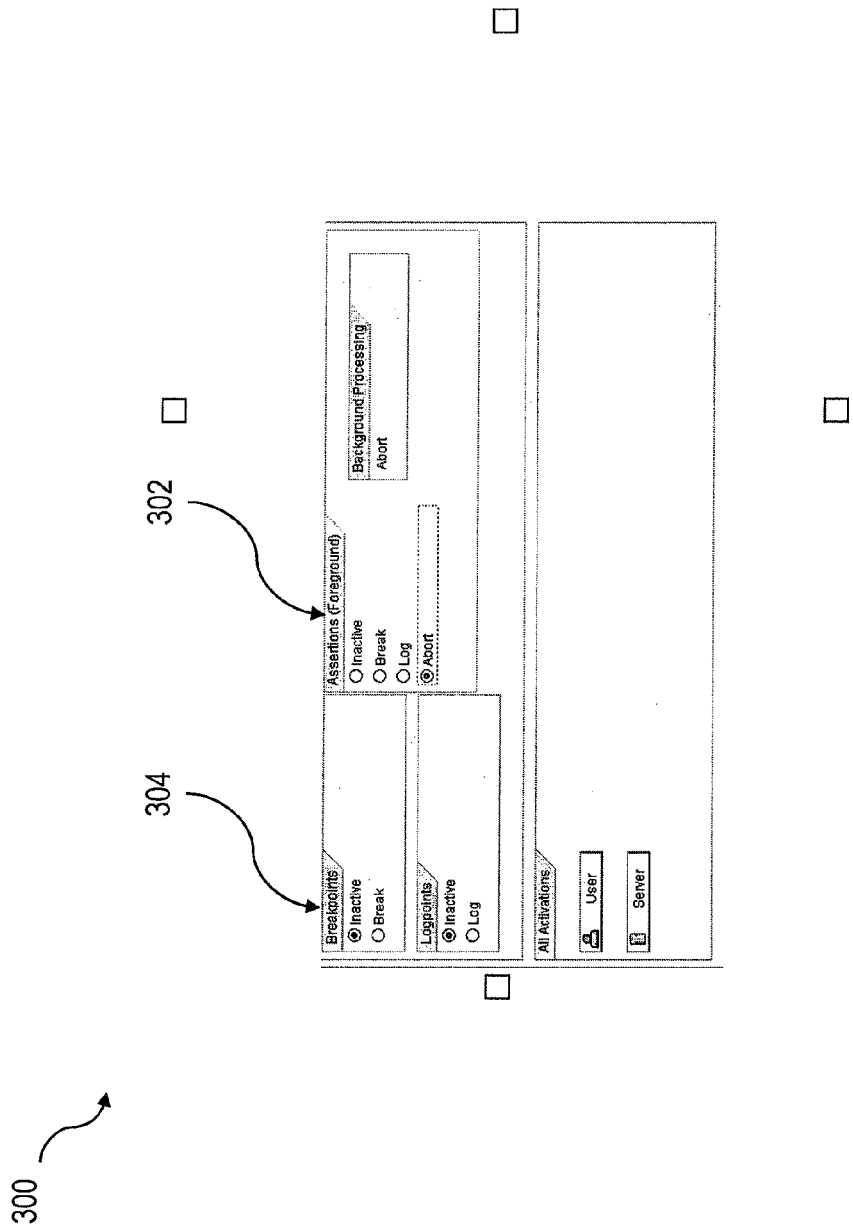
FIG. 3 shows a user interface screen shot view.

FIG. 3 shows a screen shot 300 of a user interface that includes at least some features consistent with the current subject matter. A developer, administrator, or the like can set one or more activation conditions for a context check via such a screen. For example, a decision whether to abort, log, break, or inactivate an API if a context mismatch is detected can be set using one or more assertions control elements 302. One or more breakpoint control elements 304 can be used to set whether context checks are or are not active. One or more log point control elements can be used to set whether context checks logging of context check mismatches is active or inactive. A history display area can be provided for displaying detected context mismatches. These can optionally be binned according to one or more criteria, such as for example personal or server-wide as shown in FIG. 3 to indicate to a developer what number of context mismatches he or she is responsible for.

Figure 4:
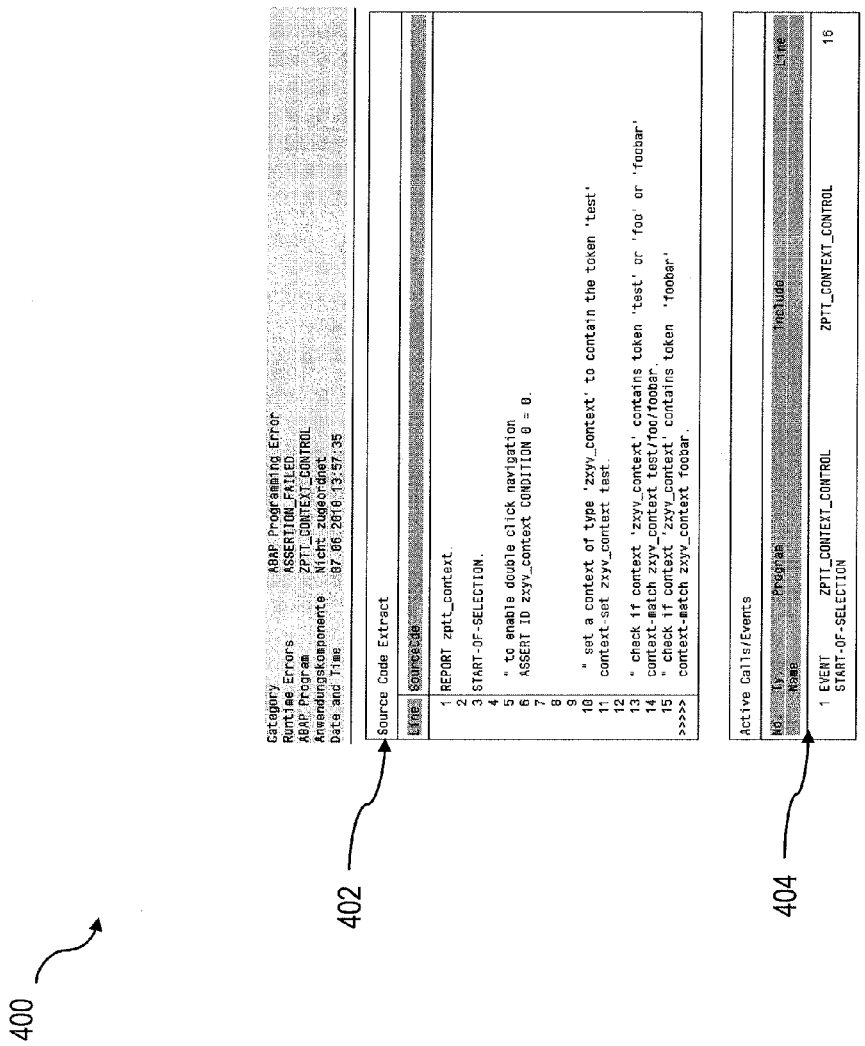
FIG. 4 shows a second user interface screen shot view.

FIG. 4 shows a second screen shot 400 illustrating a display in a system monitor user interface that results on a context mismatch. The coding sub-window 402 shows a routine that can be used to check for one of three context tokens labeled "test," "foo," and "foobar." The check reporting window 404 displays a report on where in a programming sequence an errant context call was made.

Some implementations of the current subject matter can be used in a software delivery configuration in which services provided to each of multiple organizations are hosted on a dedicated system that is accessible only to that organization. To make more efficient use of computing resources of a SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes. Customized solutions can also include services provided by one or more external software vendors that are integrated into a core software platform to provide targeted features to specific users or tenants.

Such an approach can introduce several challenges. Making modifications to the core software platform, for example updating to a new version, implementing a change to the core functionality, or the like, can become a complicated and unpredictable process if each tenant's customized data objects and other tenant-specific configurations do not react in the same manner to the modifications. Furthermore, because of the complexity of such architectures, and the large number of development teams that can be involved, for example with the core software platform, one or more external software vendors, and key users or administrators that make customizations to a specific tenant, performance optimization can be quite difficult. Developers and test programmers for a specific tenant may, for example, design multiple versions of an API for a specific function. For example, a development version of an API may be coded less efficiently but include a larger degree of control over how tasks are accomplished to better enable adaptation during the development process to changes in that and other APIs with which it interacts. A final customer-ready run time version of the API may provide less flexibility and/or adaptability, but may therefore be better optimized for performance in a run time environment.

Figure 5:
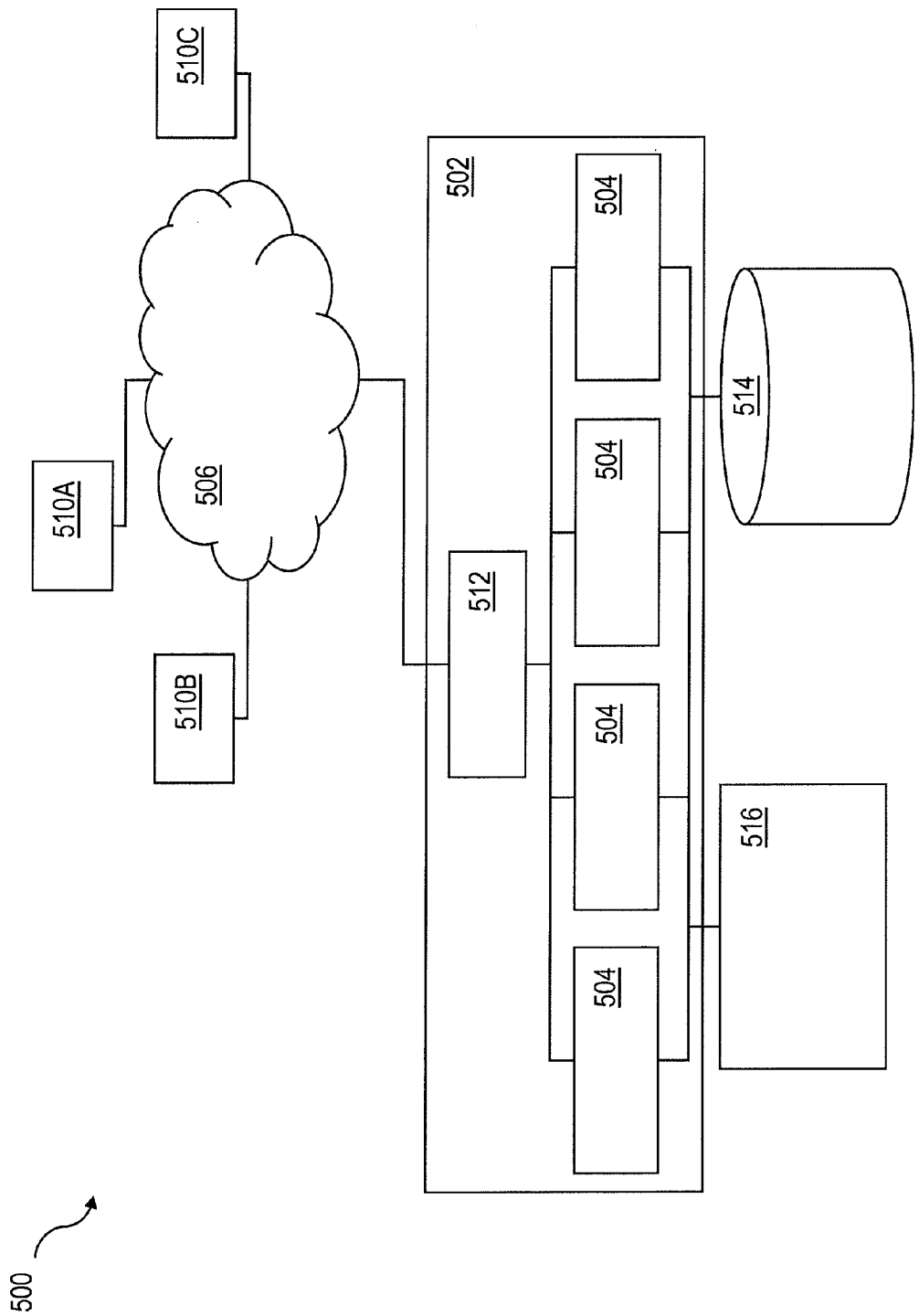
FIG. 5 is a diagram showing an example of a multi-tenant approach to providing customized software services to multiple organizations from a single architecture.

FIG. 5 shows a block diagram of a multi-tenant implementation of a software delivery architecture 500 that includes an application server 502, which can in some implementations include multiple server systems 504 that are accessible over a network 506 from client machines operated by users at each of multiple organizations 510A-510C (referred to herein as "tenants" of a multi-tenant system) supported by a single software delivery architecture 500. For a system in which the application server 502 includes multiple server systems 504, the application server can include a load balancer 512 to distribute requests and actions from users at the one or more organizations 510A-510C to the one or more server systems 504. A user can access the software delivery architecture across the network using a thin client, such as for example a web browser or the like, or other portal software running on a client machine. The application server 502 can access data and data objects stored in one or more data repositories 514. The application server 502 can also serve as a middleware component via which access is provided to one or more external software components 516 that can be provided by third party developers.

To provide for customization of the core software platform for each of multiple organizations supported by a single software delivery architecture 500, the data and data objects stored in the repository or repositories 514 that are accessed by the application server 502 can include three types of content as shown in FIG. 6: core software platform content 602, system content 604, and tenant content 606. Core software platform content 602 includes content that represents core functionality and is not modifiable by a tenant. System content 604 can in some examples be created by the runtime of the core software platform and can include core data objects that are modifiable with data provided by each tenant. For example, if the core software platform is an ERP system that includes inventory tracking functionality, the system content 604A-604N can include data objects for labeling and quantifying inventory. The data retained in these data objects are tenant-specific: for example, each tenant 510A-510N stores information about its own inventory. Tenant content 606A-606N includes data objects or extensions to other data objects that are customized for one specific tenant 510A-510N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 606 can include condition records in generated condition tables, access sequences, price calculation results, or any other tenant-specific values. A combination of the software platform content 602 and system content 604 and tenant content 606 of a specific tenant are presented to users from that tenant such that each tenant is provided access to a customized solution whose data are available only to users from that tenant.

A multi-tenant system such as that described herein can include one or more of support for multiple versions of the core software, backwards compatibility with older versions, stateless operation in which no user data or business data are retained at the thin client, and no need for tenant configuration on the central system. As noted above, in some implementations, support for multiple tenants can be provided using an application server 502 that includes multiple server systems 504 that handle processing loads distributed by a load balancer 512. Potential benefits from such an arrangement can include, but are not limited to, high and reliably continuous application server availability and minimization of unplanned downtime, phased updating of the multiple server systems 504 to permit continuous availability (one server system 504 can be taken offline while the other systems continue to provide services via the load balancer 512), scalability via addition or removal of a server system 504 that is accessed via the load balancer 512, and de-coupled lifecycle processes (such as for example system maintenance, software upgrades, etc.) that enable updating of the core software independently of tenant-specific customizations implemented by individual tenants.

Because of the complexity of an architecture as described above and illustrated in FIG. 5, multiple developer teams can be involved in assembling a software architecture offered to an end user. During testing and development, a developer team may expose only a development version of an API or other software component interface for use by other developer teams who are working on integration of communication, data exchange, and the like between the various software components that constitute the software architecture. However, the exposed interfaces may not be the final, run time-optimized versions that are intended for use when the software is exposed to customer operations. Keeping track of which APIs and other interfaces are to be called throughout a complicated architecture by a multitude of components that may not be the same for each tenant of a multi-tenant system can be difficult if not impossible. As such, it is quite likely for a process or component to call an incorrect or context mismatched API or interface of another component absent an internal verification mechanism for identifying these context mismatches. The current subject matter provides an improved approach via which these checks can be automated to software integration processes based on calls to improperly context matched APIs and the like.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed:

1. A computer program product comprising a non-transitory machine-readable medium storing instructions that, when executed by at least one programmable processor, cause the at least one programmable processor to perform operations comprising:
receiving a call for an application programming interface from an application component at a context checking module;
determining a current application context of the application component within which the call for the application programming interface was generated;
comparing a context token of the application programming interface with the current application context, the context token having been added at design time and selected from a limited set of pre-defined contexts; and
executing a remedial action if the application context does not match the context token.

2. A computer program product as in claim 1, wherein the remedial action comprises at least one of terminating the call for the application programming interface, sending or displaying an alert message to the user whose process called the application programming interface, notifying a team leader or other member of a development team, creating an event log entry relating to the call, and notifying quality management personnel.

3. A computer program product as in claim 1, wherein the current application context is part of a core software platform that integrates functionality of a plurality of application components from a plurality of development teams, and the application programming interface is part of an application component of the plurality of application components.

4. A computer program product as in claim 1, wherein the current application context comprises one of run time, design time, testing, authorization check, database access, and user interface access.

5. A computer program product as in claim 1, wherein a developer of the application programming interface is part of a first development entity, and the application programming interface is exposed for integration of at least one of communication and data exchange with at least one second application component developed by a second development entity distinct from the first development entity.

6. A computer program product as in claim 5, wherein the application component and the second application component are accessed within a multi-tenant architecture comprising:
   an application server providing access for each of a plurality of organizations to at least one of a plurality of client tenants, the client tenants each being configured to provide isolated access to a customizable instance of a core software platform; and
   a data repository comprising core software platform content common to all of the plurality of client tenants and relating to operation of the core software platform, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

7. A system comprising:
   at least one programmable processor; and
   a machine-readable medium storing instructions that, when executed by the at least one processor, cause the at least one programmable processor to perform operations comprising:
   receiving a call for an application programming interface from an application component at a context checking module;
   determining a current application context of the application component within which the call for the application programming interface was generated;
   comparing a context token of the application programming interface with the current application context, the context token having been added at design time and selected from a limited set of pre-defined contexts; and
   executing a remedial action if the application context does not match the context token.

8. A system as in claim 7, wherein the remedial action comprises at least one of terminating the call for the application programming interface, sending or displaying an alert message to the user whose process called the application programming interface, notifying a team leader or other member of a development team, creating an event log entry relating to the call, and notifying quality management personnel.

9. A system as in claim 7, wherein the current application context is part of a core software platform that integrates functionality of a plurality of application components from a plurality of development teams, and the application programming interface is part of an application component of the plurality of application components.

10. A system as in claim 7, wherein the current application context comprises one of run time, design time, testing, authorization check, database access, and user interface access.

11. A system as in claim 7, wherein a developer of the application interface is part of a first development entity, and the application programming interface is exposed for integration of at least one of communication and data exchange with at least one second application component developed by a second development entity distinct from the first development entity.

12. A system as in claim 11, wherein the application component and the second application component are accessed within a multi-tenant architecture comprising:
   an application server providing access for each of a plurality of organizations to at least one of a plurality of client tenants, the client tenants each being configured to provide isolated access to a customizable instance of a core software platform; and
   a data repository comprising core software platform content common to all of the plurality of client tenants and relating to operation of the core software platform, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

13. A computer-implemented method comprising:
   receiving a call for an application programming interface from an application component at a context checking module;
   determining a current application context of the application component within which the call for the application programming interface was generated;
   comparing a context token of the application programming interface with the current application context, the context token having been added at design time and selected from a limited set of pre-defined contexts; and
   executing a remedial action if the application context does not match the context token.

14. A computer-implemented method as in claim 13, wherein the remedial action comprises at least one of terminating the call for the application programming interface, sending or displaying an alert message to the user whose process called the application programming interface, notifying a team leader or other member of a development team, creating an event log entry relating to the call, and notifying quality management personnel.

15. A computer-implemented method as in claim 13, wherein the current application context is part of a core software platform that integrates functionality of a plurality of application components from a plurality of development teams, and the application programming interface is part of an application component of the plurality of application components.

16. A computer-implemented method as in claim 13, wherein the current application context comprises one of run time, design time, testing, authorization check, database access, and user interface access.

17. A computer-implemented method as in claim 13, wherein at least one of the receiving, determining, comparing, and executing is performed by at least one processor.

18. A computer-implemented method as in claim 13, wherein a developer of the application programming interface is part of a first development entity, and the application programming interface is exposed for integration of at least one of communication and data exchange with at least one second application component developed by a second development entity distinct from the first development entity.

19. A computer-implemented method as in claim 18, wherein the application component and the second application component are accessed within a multi-tenant architecture comprising:
- an application server providing access for each of a plurality of organizations to at least one of a plurality of client tenants, the client tenants each being configured to provide isolated access to a customizable instance of a core software platform; and
- a data repository comprising core software platform content common to all of the plurality of client tenants and relating to operation of the core software platform, system content having a system content format defined by the core software platform and containing system content data that are unique to specific client tenants of the plurality of client tenants, and tenant-specific content items whose tenant-specific content formats and tenant-specific content data are defined by and available to only one of the plurality of client tenants.

* * * * *